United States Patent [19]

Kobayashi

[11] Patent Number: 4,556,248

[45] Date of Patent: Dec. 3, 1985

[54] OPENABLE SIDE PANEL FOR LOAD CARRYING VEHICLES

[75] Inventor: Nobuo Kobayashi, Toyota, Japan

[73] Assignee: Meidai Bussan Kabushiki Kaisha, Toyota, Japan

[21] Appl. No.: 578,001

[22] Filed: Feb. 8, 1984

[51] Int. Cl.⁴ .............................................. B60J 7/16
[52] U.S. Cl. .................................. 296/183; 296/181; 49/386
[58] Field of Search .................... 296/181, 183, 57 A, 296/56, 100; 105/378, 377; 267/9 B, 20 R, 61 R, 167; 49/386, 339; 248/569, 568, 292.1, 293

[56] References Cited

U.S. PATENT DOCUMENTS

| | | | |
|---|---|---|---|
| 2,711,343 | 6/1955 | Falk et al. | 296/56 |
| 2,929,591 | 3/1960 | Etchells et al. | 248/568 |
| 4,083,596 | 4/1978 | Robertson | 296/100 |
| 4,350,382 | 9/1982 | Spronck | 296/57 A |

FOREIGN PATENT DOCUMENTS

| | | |
|---|---|---|
| 7136470 | 2/1972 | Fed. Rep. of Germany . |
| 7409720 | 10/1974 | Fed. Rep. of Germany . |
| 2601128 | 7/1976 | Fed. Rep. of Germany . |
| 2809375 | 9/1979 | Fed. Rep. of Germany . |
| 510464 | 8/1939 | United Kingdom ............ 296/57 A |
| 719336 | 12/1954 | United Kingdom ............ 296/57 A |
| 1017836 | 1/1966 | United Kingdom . |

Primary Examiner—Robert R. Song
Attorney, Agent, or Firm—Staas & Halsey

[57] ABSTRACT

A side panel which is openably and closably mounted on a bed of a load carrying vehicle includes a pipe in which a compression coil spring is disposed with its one end secured to the pipe. The other end of the compression coil spring is connected to a guide plate movable through a slot in the pipe and pivotably coupled to a link pivotably connected to a frame mounted on the bed. The side panel can be angularly moved between the open and closed positions with a small manual force with the aid of the resiliency of the compression coil spring. The secured end of the compression coil spring is positionally adjustable within the pipe so that the resilient force of the compression coil spring can be varied. The compression coil spring is held in frictional engagement with the pipe to allow the side panel to be brought to a stop at any desired position between the open and closed positions.

19 Claims, 16 Drawing Figures

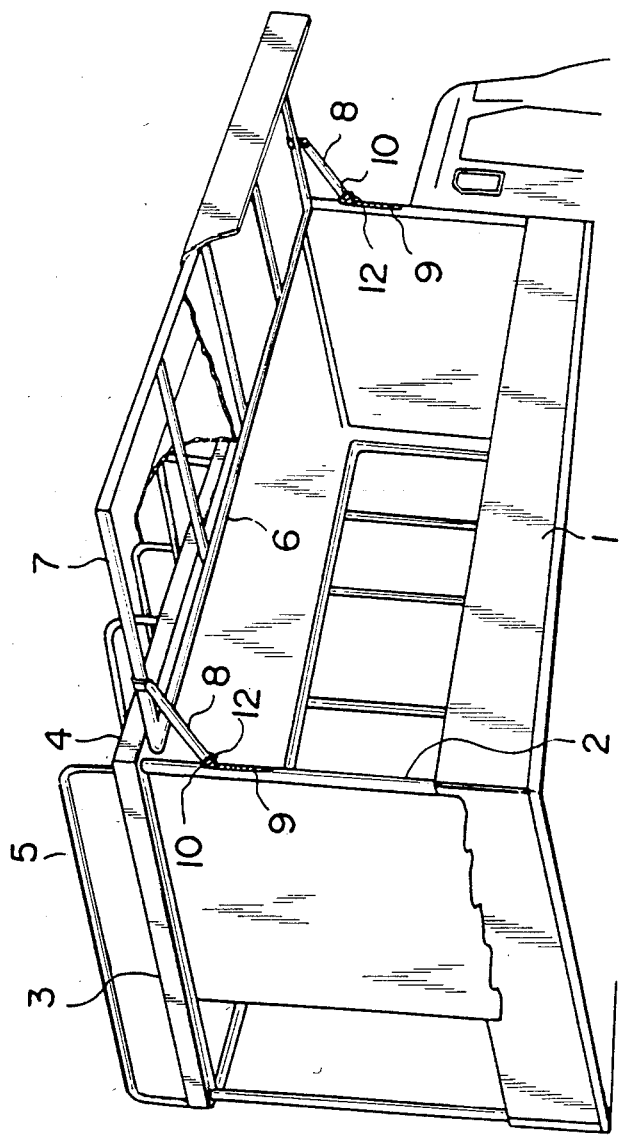

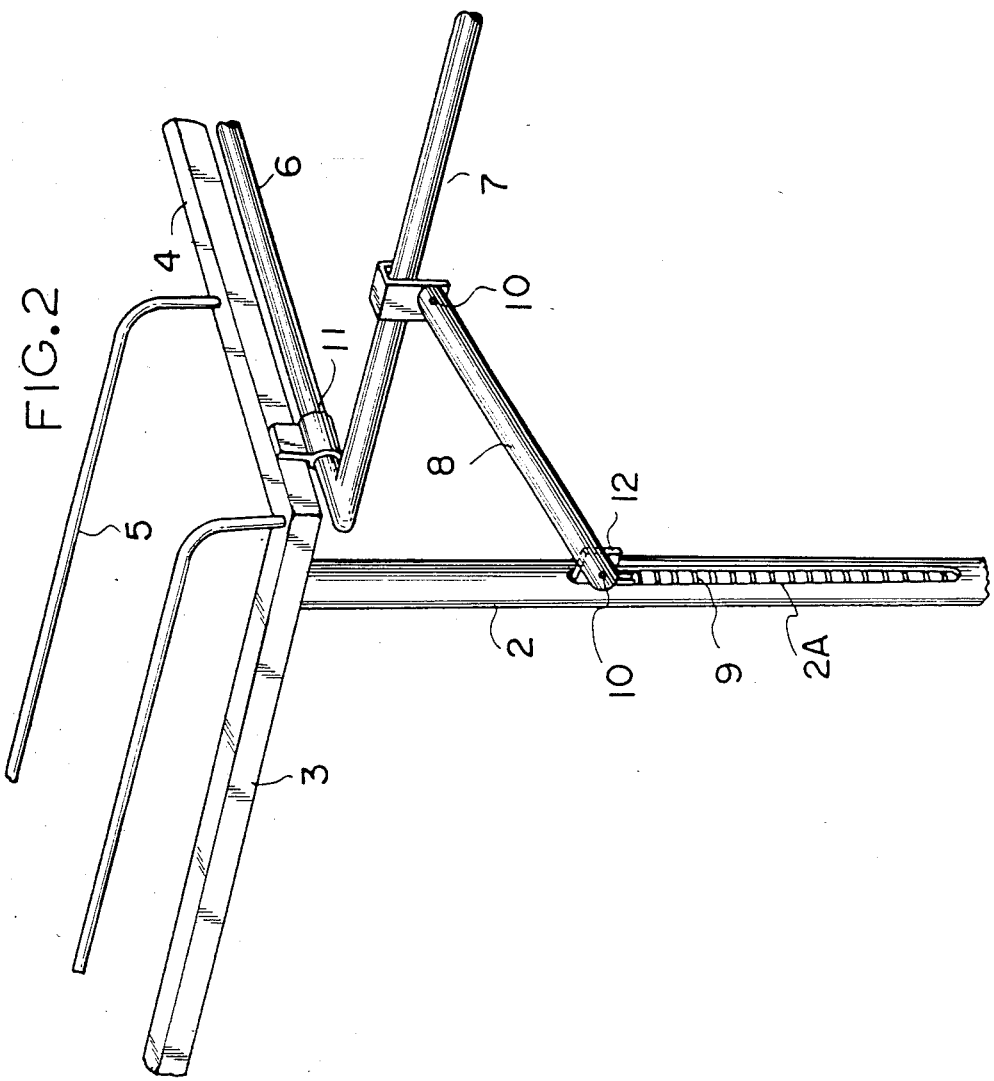

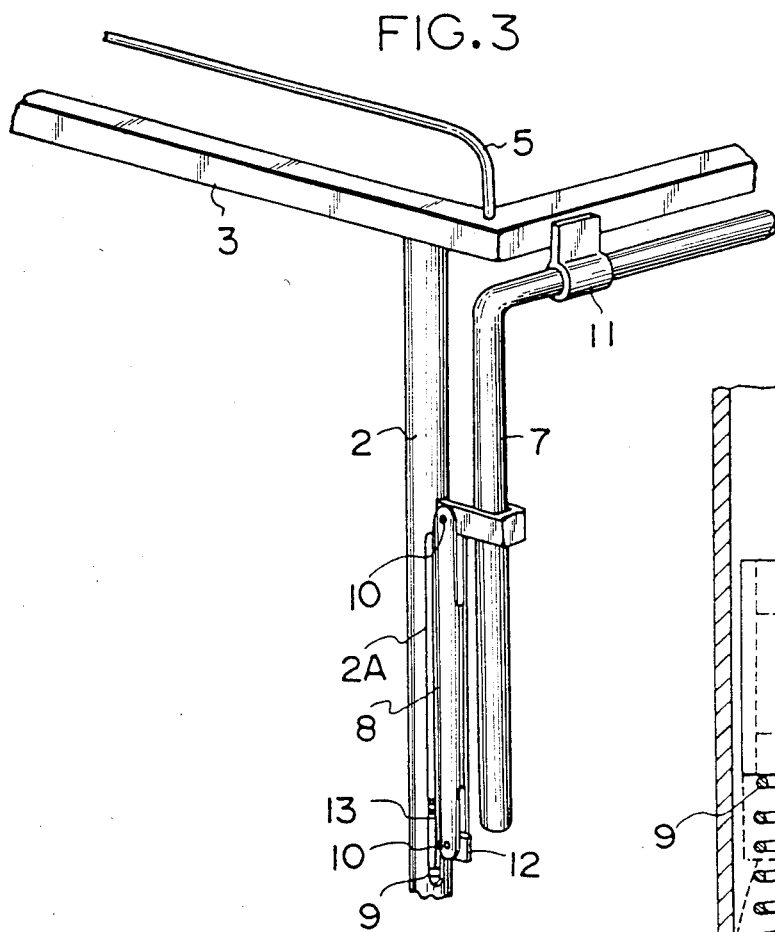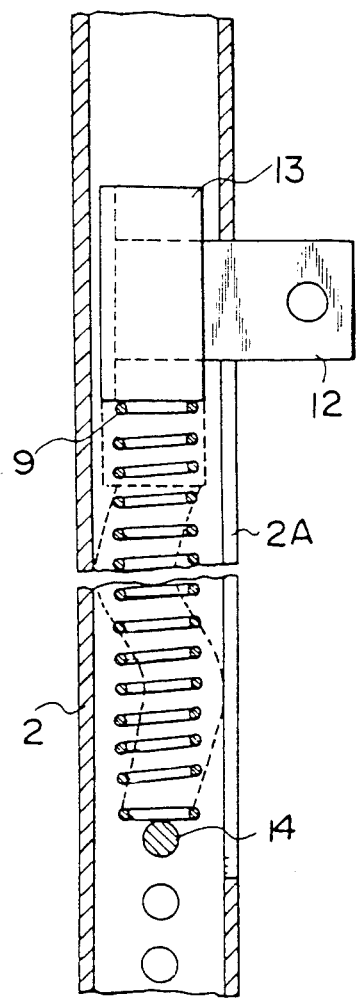

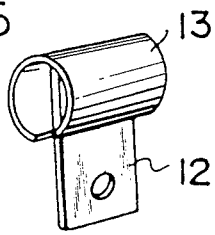
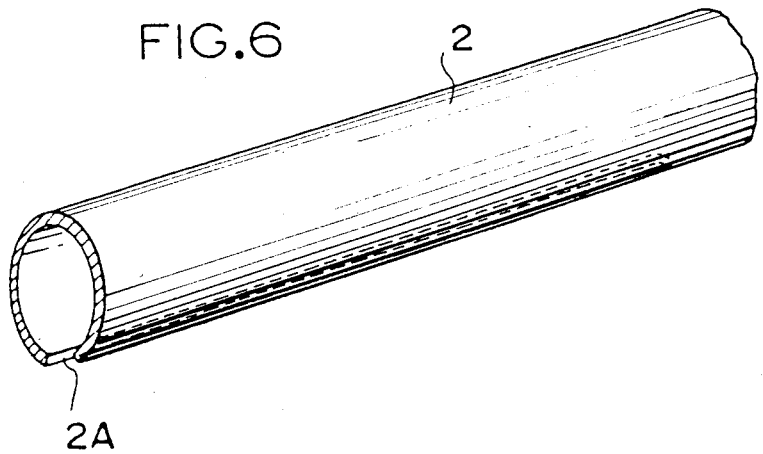
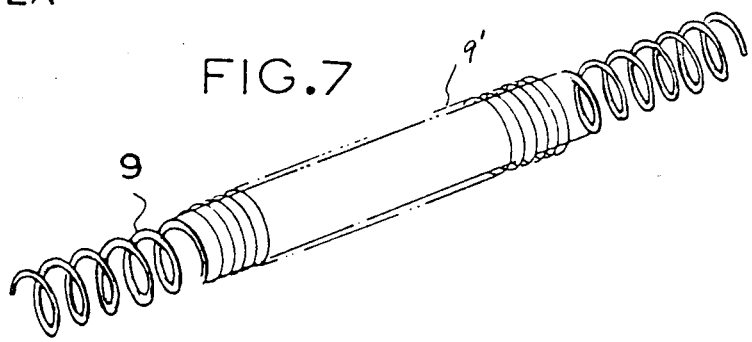

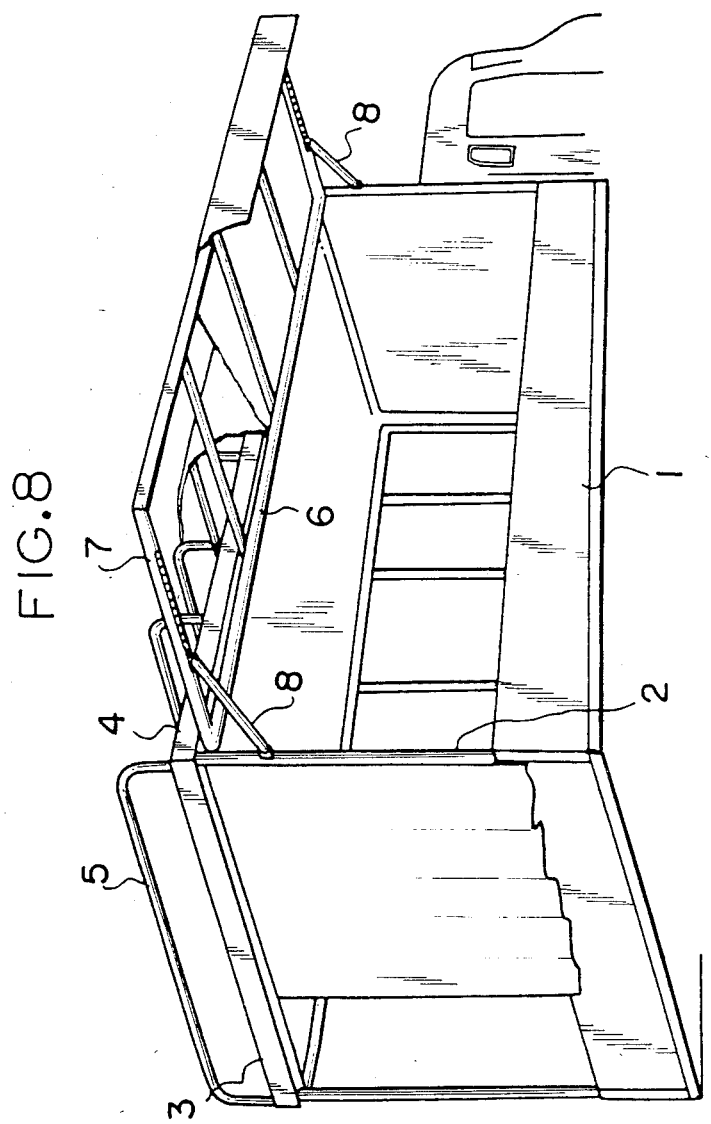

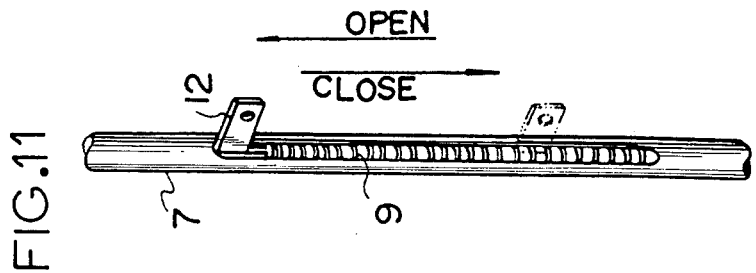
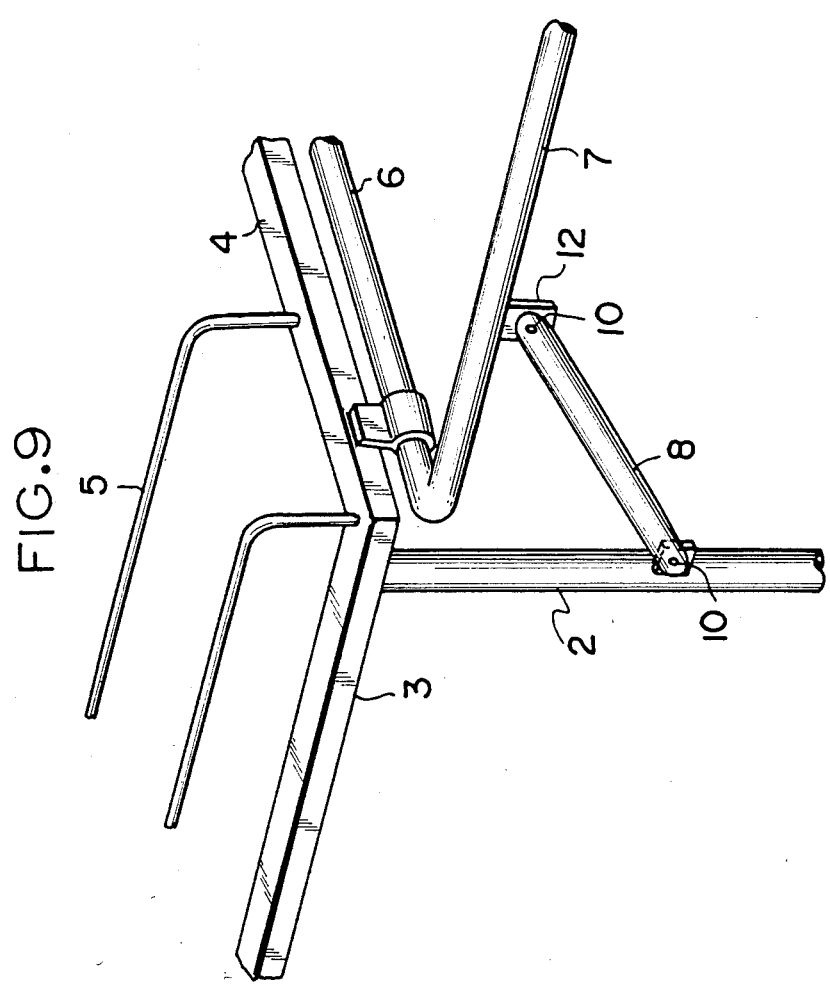

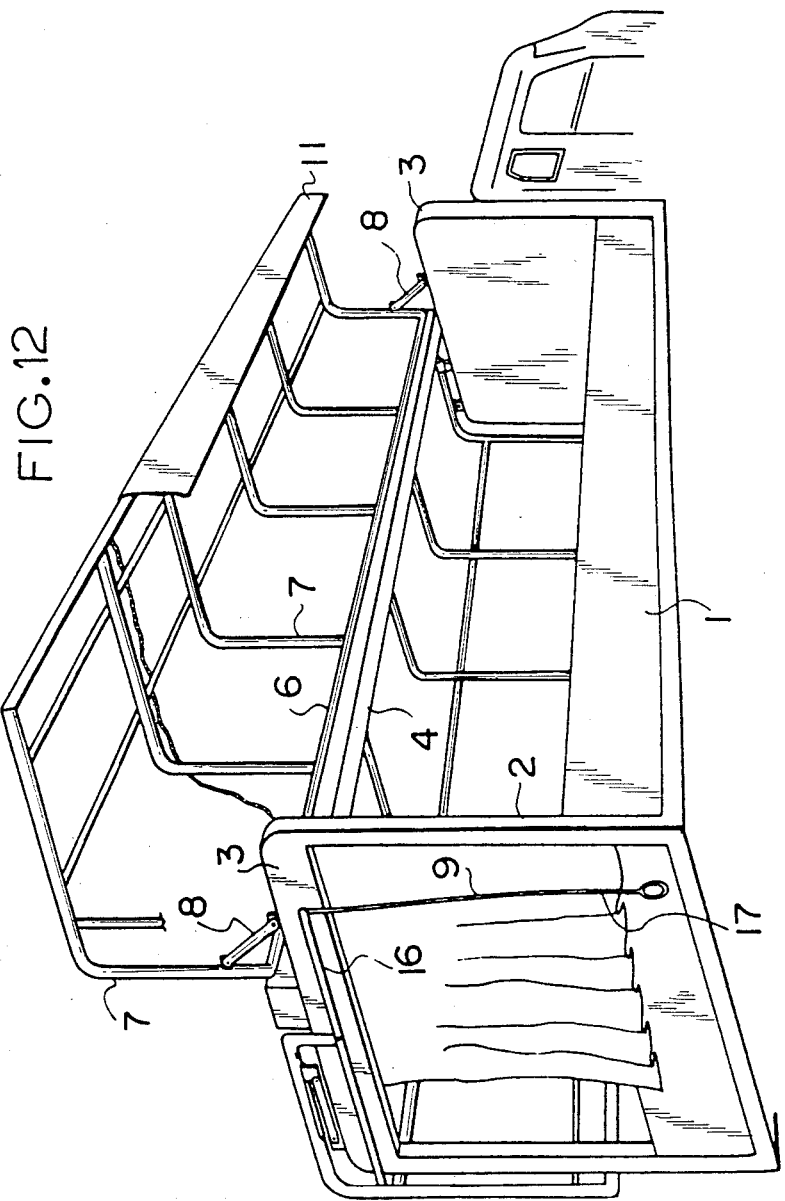

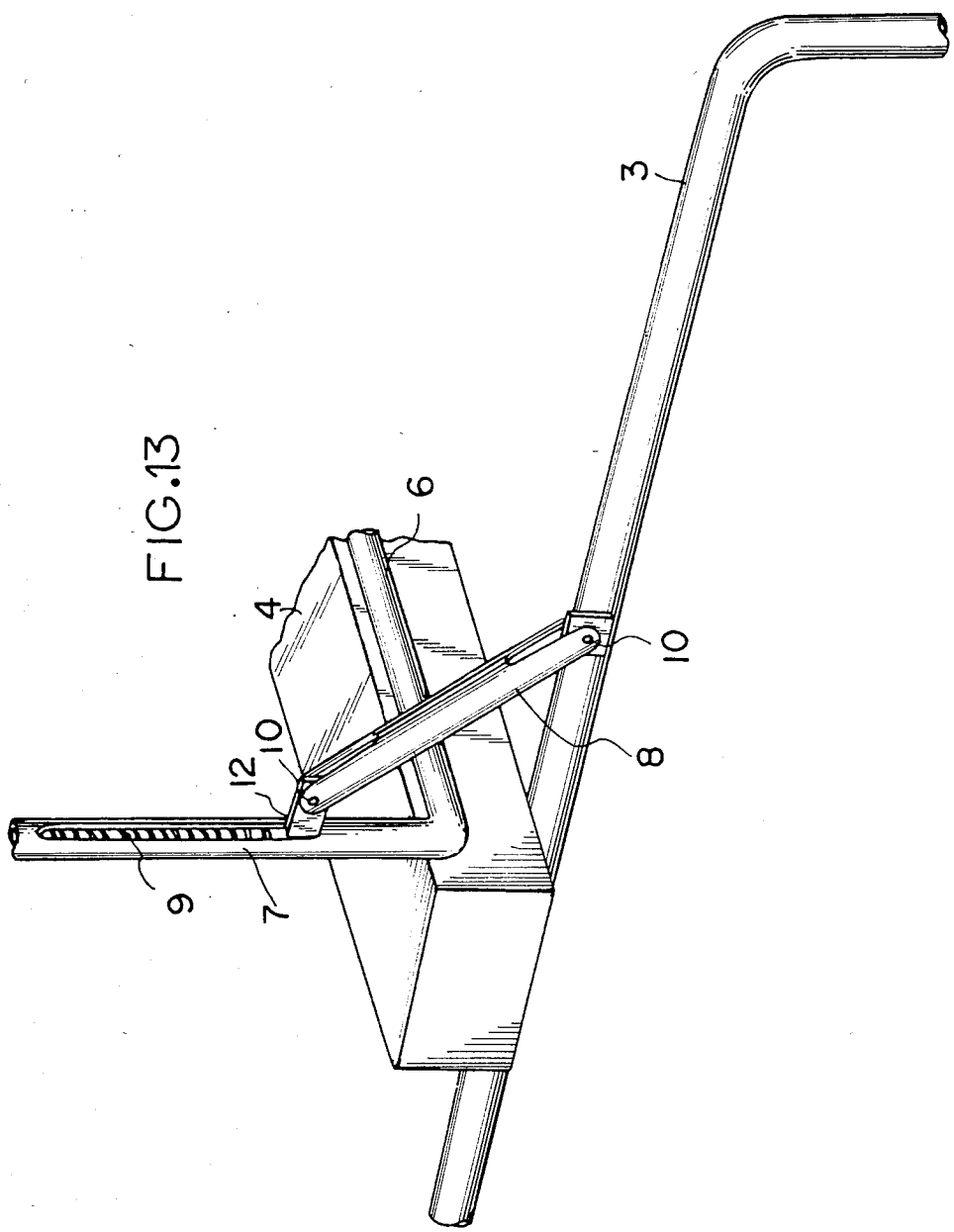

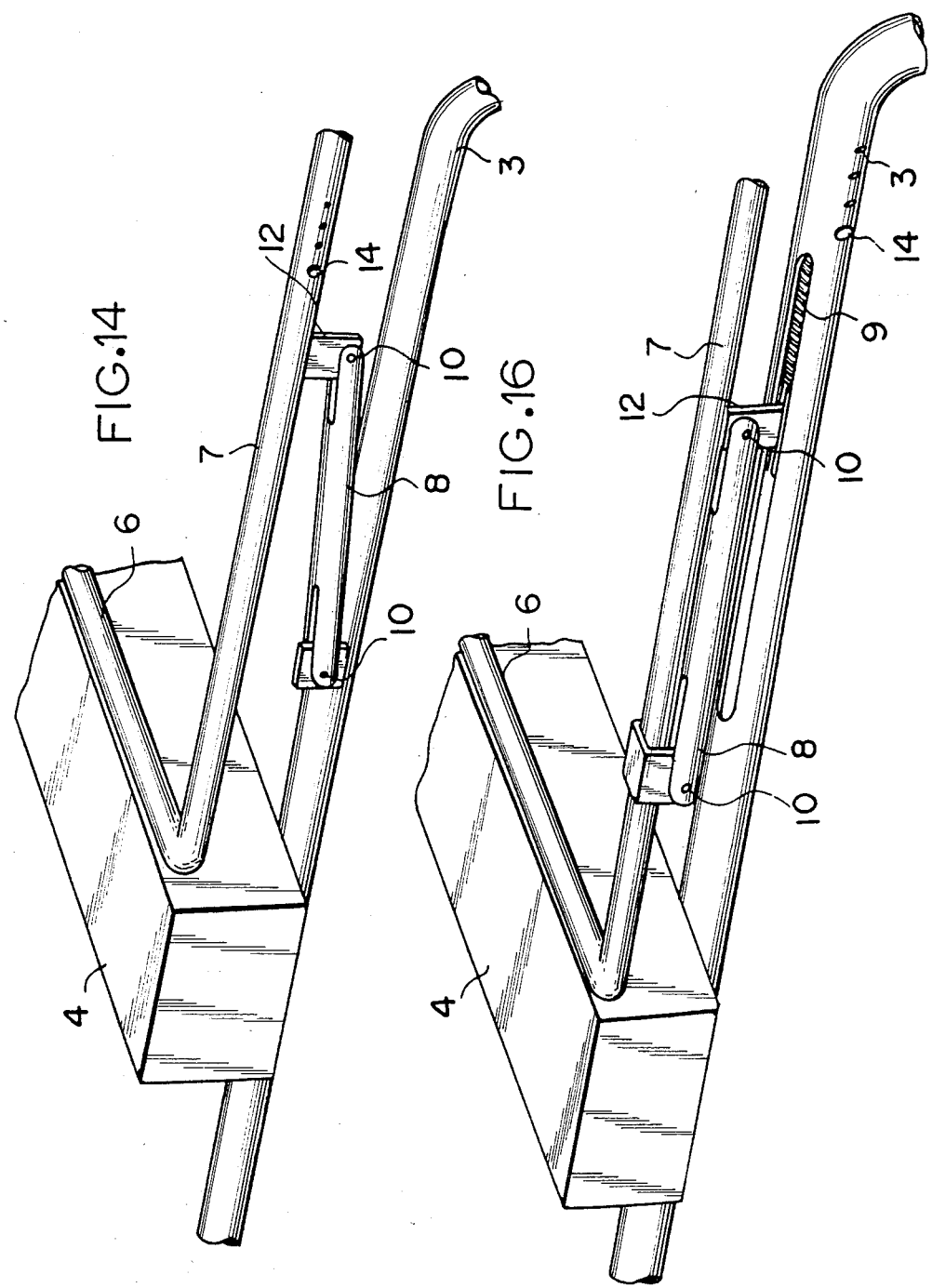

OPENABLE SIDE PANEL FOR LOAD CARRYING VEHICLES

BACKGROUND OF THE INVENTION

The present invention relates to an openable side panel mechanism for selectively opening and closing a side panel on the bed or floor of a truck, a trailer, or other load carrying vehicles under the resilient forces applied by compression coil springs.

Attempts have heretofore been made to provide load carrying vehicles such as trucks and trailers, having a side cover or panel mounted on the horizontal floor and manually openable laterally of the vehicle for loading and unloading articles. The opening motion of the side panel is assisted by the biasing forces of springs coacting with a toggle mechanism as a relatively large force is required to open the side panel laterally. One such openable side panel device is disclosed by Japanese Utility Model Publication No. 54-2496. The disclosed arrangement includes a plurality of springs for biasing the side panel to be kept selectively in open and closed positions under the resilient forces of the springs which are reversible in direction while the side panel is being moved between the open and closed positions by a rope pulled by the operator. The springs employed are in the form of coil springs in order to keep the side panel urged in the closed position and to reduce the force required to open and close the side panel. The known side panel device is disadvantageous in that it is time-consuming and tedious to adjust the resilient forces of the springs individually to a suitable level. While the springs coact with the toggle mechanism to allow the side panel to be opened and closed with a smaller force and no braking force, the side panel is strongly biased in the open and closed positions and is relatively unstable at a midpoint or dead point between the open and closed positions. The side panel therefore has a tendency to shift toward either the open or the closed position at all times across the dead point, with the result that the side panel cannot be handled by the operator as desired. The side panel is supported on transverse beams mounted centrally on the truck bed at its front and rear ends, respectively. The transverse beams therefore should be heavy and rugged in construction. This requires that the side panel be fastened by the rope to avoid any danger of upward or downward displacement when the side panel is positioned somewhere between the open and closed positions.

SUMMARY OF THE INVENTION

It is an object of the present invention to provide an openable side panel mechanism for load carrying vehicles which has a side panel openable and closable with a small force, has a reduced number of springs, and requires no heavy transverse beams which would support a side panel.

Another object of the present invention is to provide an openable side panel mechanism for load carrying vehicles which includes means for exerting adjustable forces tending to reduce the force with which a side panel can be opened and closed down to a desired level.

Still another object of the present invention is to provide an openable side panel mechanism for load carrying vehicles which is capable of stopping a side opanel at any desired position anywhere between open and closed positions of the side panel.

According to the present invention, a compression coil spring is disposed in a cylindrical body which may comprise a portion of a frame assembly mounted on a bed of a load carrying vehicle or a portion of a side panel pivotably mounted on the frame assembly for angular movement between open and closed positions, the compression coil spring having one end secured to the cylindrical body. The side panel can be angularly moved between the open and closed positions with the aid of resiliency of the compression coil spring. The other end of the compression coil spring is movable in the cylindrical body and operably connected through a guide plate to a link which is pivotably coupled to the frame assembly or the side panel. The secured end of the compression coil spring is adjustable in position with respect to the cylindrical body, so that the resilient force of the compression coil spring can be adjusted to permit the operator to open and close the side panel with a desired force. The compression coil spring is held in frictional engagement with the cylindrical body so as to be subjected to braking action such that the side panel can be stopped anywhere as desired between the open and closed positions.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a fragmentary perspective view of a truck equipped with an openable side panel mechanism according to an embodiment of the present invention;

FIG. 2 is an enlarged fragmentary perspective view of the openable side panel mechanism depicted in an open position;

FIG. 3 is an enlarged fragmentary perspective view of the openable side panel mechanism depicted in a closed position;

FIG. 4 is an enlarged fragmentary vertical cross-sectional view of a post in the openable side panel mechanism;

FIG. 5 is a perspective view of a piston and a guide plate fitted therein for the operable side panel mechanism;

FIG. 6 is a fragmentary perspective view of the post for the openable side panel mechanism;

FIG. 7 is a fragmentary perspective view of a compression coil spring in the openable side panel mechanism;

FIG. 8 is a fragmentary perspective view of a truck equipped with an openable side panel mechanism according to another embodiment of the present invention;

FIG. 9 is an enlarged fragmentary perspective view of the openable side panel mechanism of FIG. 8 depicted in an open position;

FIG. 11 is a fragmentary perspective view of a guide plate moving with respect to a frame member shown displaced from open to closed positions for the openable side panel mechanism;

FIG. 12 is a fragmentary perspective view of a truck equipped with an openable side panel mechanism according to still another embodiment of the present invention;

FIG. 13 is an enlarged fragmentary perspective view of the openable side panel mechanism of FIG. 12 depicted in an open position;

FIG. 14 is an enlarged fragmentary perspective view of the openable side panel mechanism of FIG. 12 depicted in a closed position;

FIG. 16 is a fragmentary perspective view of the openable side panel mechanism of FIG. 15 depicted in a closed position.

DESCRIPTION OF THE PREFERRED EMBODIMENT

Figure 10:
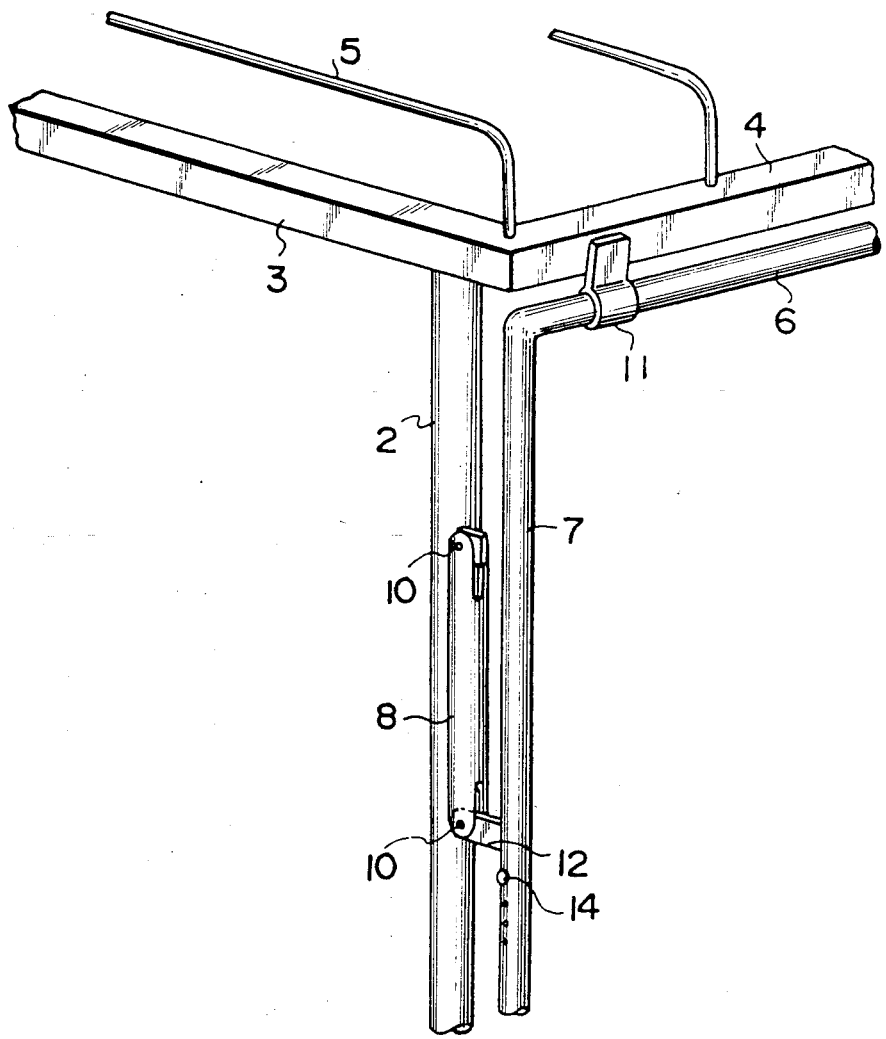
FIG. 10 is an enlarged fragmentary perspective view of the openable side panel mechanism of FIG. 8 depicted in a closed position.

As shown in FIG. 1, a truck bed 1 supports thereon a plurality of upstanding posts 2 on which are mounted transverse and longitudinal beams 3, 4, the upstanding posts 2 and the beams 3, 4 jointly forming a frame assembly which includes a pair of inverted U-shaped spaced frames vertically disposed respectively at front and rear positions on the truck bed 1. In FIG. 2, a side panel is composed of frame members 6, 7 in the form of cylindrical bodies or pipes, and the frame members 7 are pivotably joined by links 8 to guide plates 12 disposed at one end of compression coil springs 9 mounted in the posts 2, respectively, the links 8 being pivotally coupled to the frame members 7 and the guide plates 12 by means of pins 10. When the side panel is in an open position as shown in FIG. 2, the compression coil springs 9 are extended to push up the guide plates 12, causing the links 8 to lift the frame members 7. The frame member 6 is angularly movably supported on the longitudinal beam 4 by hinges or pipe collars 11, an arrangement which dispenses with large-size transverse beams as disclosed in Japanese Utility Model Publication No. 54-2496. When in a closed position as illustrated in FIG. 3, the guide plate 12 is displaced all the way down to the bottom end of a vertical longitudinal slot 2A defined in the post 2, while at the same time the link 8 is erected substantially vertically to close the side panel. In FIG. 4, the compression coil spring 9 placed in the post 2 has a lower end engaged by a knock pin 14 and an upper end engaged by a piston 13 coupled with the guide plate 12. The piston 13 has a cylindrical configuration complementarily fitted in the post 2, as shown in FIGS. 4 and 5, and the guide plate 12 is slidably placed in the slot 2A in the post 2, as shown in FIGS. 4 and 6.

The compression coil spring 9 has a coil diameter 9' varying with coil pitch as shown in FIG. 7. Due to its nature, when the coil spring is compressed and the coil pitch is shortened, a diameter 9' of the coil is outwardly and diametrically enlarged. The varying coil diameter of the compression coil spring 9 is effective to cause the compression coil spring 9 to slide frictionally along the inner wall of the post 2 so that the piston 13 can be stopped anywhere in its range of movement in the post 2. Therefore, the side panel can be stopped at any desired position between its open and closed positions. By manually pushing the frame member 7 upwardly, the frame member 7 can then be moved toward the open position under the manual upward force and the resiliency of the compression coil spring 9 which exceed the frictional force acting on and tending to stop the compression coil spring 9. Accordingly, the side panel can easily be opened manually with the aid of the compression coil spring 9. The compression coil spring 9 has a tendency to flex unevenly as shown by the broken line in FIG. 4 as it is compressed, and is pressed against the inner wall of the post 2, thus causing friction between the compression coil spring 9 and the inner wall of the post 2. This enables the piston 13 to be stopped at any desired position. The post 2 may have a plurality of holes in which the knock pin 14 can be selectively disposed. The force which is imposed by the compression coil spring 9 on the frame member 7 through the link 8 can be adjusted simply by changing the hole in which the knock pin 14 is received. After the side panel has been manually lowered to the closed position, the resilient force of the compression coil spring 9 which acts between the fulcrum constituted by the hinges or pipe collars 11 and the fulcrum constituted by the guide plates 12 is well counterbalanced by the weight of the side panel, which is therefore prevented from moving up.

FIG. 8 shows an openable side panel mechanism according to another embodiment. With this embodiment, a compression coil spring 9 and an associated guide plate 12 are mounted in each frame member 7 of a side panel. The side panel is shown in FIG. 9 as being in its open position, and is shown in FIG. 10 as being in its closed position. As illustrated in FIG. 11, the guide plate 12 moves downwardly along the frame member 7 while the side panel of FIG. 8 is being displaced from its open to closed positions.

FIG. 12 is illustrative of an openable side panel mechanism according to still another embodiment. As shown in FIG. 13, a compression coil spring 9 is disposed in a frame member 7 of a roof and side panel of a generally L-shaped cross section, and a link 8 is pivotally connected by pins 10 between a transverse beam 3 and a guide plate 12 mounted on one end of the compression spring 9 and movable along the frame member 7. An actuator lever 16 is secured to the frame member 7 and has one end fastened to a control rope 17. When the control rope 17 is pulled down, or the frame member 7 is manually pushed upwardly, the roof and side panel can be angularly moved through substantially 90° from a closed position as shown in FIG. 14 to an open position as shown in FIG. 13. When in the closed position, the resilient force of the compression coil spring 9 is counterbalanced by the weight of the roof and side panel due to the positions in which the link 8 and the pins 10 are located, thus preventing the roof and side panel from opening up. By pulling the control rope 17 downwardly obliquely, the actuator lever 16 imposes an upward force on the frame member 7 and the link 8 is allowed to rise upwardly. The roof and side panel starts rising under the force from the coil spring 9 in compression and the force with which the control rope 17 is pulled. As the roof and side panel opens, the resilient force of the compression coil spring 9 becomes progressively smaller. However, the center of gravity of the roof and side panel is shifted toward the fulcrum about which the roof and side panel is angularly movable as the panel approaches the open position. Thus, the roof and side panel can be brought to the open position with a relatively small force and stably held in the open position which is angularly spaced by about 90° from the closed position.

Figure 15:
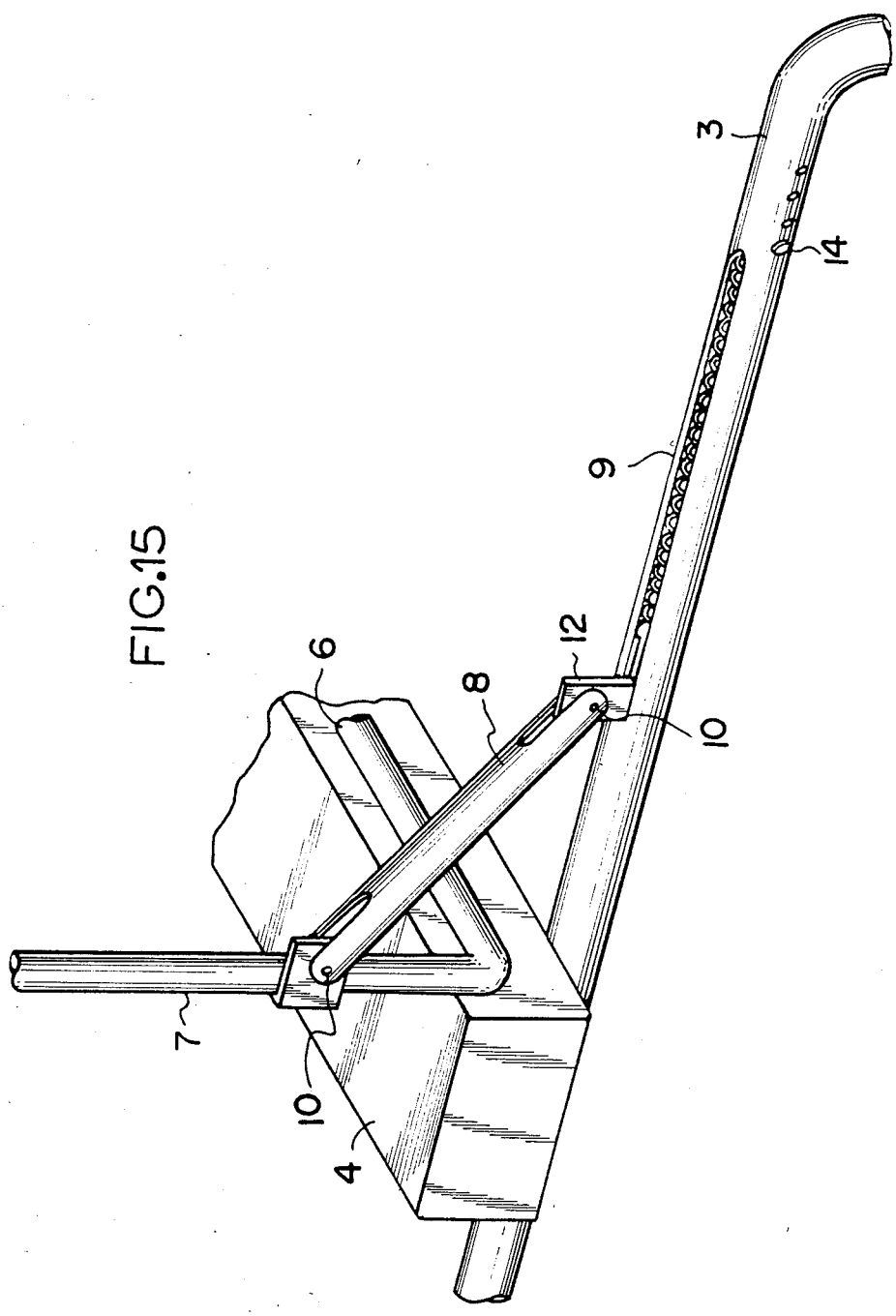
FIG. 15 is a fragmentary perspective view of an openable side panel mechanism according to a still further embodiment of the present invention, the openable side panel being in an open position.

FIGS. 15 and 16 illustrate a modification of the mechanism shown in FIGS. 13 and 14. According to the modification of FIGS. 15, 16, a compression coil spring 9 and a guide plate 12 are placed in a transverse beam 3.

With the arrangements of the present invention, the compression coil spring is disposed in a cylindrical body, and the side panel can be opened with a relatively small force under the resiliency of the compression coil spring, the cylindrical body being composed of the lateral beam or the frame member of the side panel. Since the spring is not exposed to view, the side panel mechanism is attractive in appearance and safe in operation. The number of springs which are required is reduced, the mechanism is simple and lightweight, and can be disassembled in kit-form for easy shipment and assembly.

The fixed end of the compression coil spring mounted in the cylindrical body is adjustable, and the resilient force of the compression coil spring acts on the frame member through the link mechanism including the guide plate mounted on the other end of the compression coil spring. This allows the side panel to be opened and closed with a small force. The resilient force of the compression coil spring can be adjusted by changing the fixed position thereof.

The compression coil spring is frictionally disposed in the cylindrical body so that the opening and closing motion and braking of the side panel can be controlled by the resiliency and friction of the compression coil spring. The side panel can be brought to a stop anywhere as desired between the open and closed positions.

Although certain preferred embodiments have been shown and described in detail, it should be understood that many changes and modifications may be made therein without departing from the scope of the appended claims.

What is claimed is:

1. An openable side panel mechanism for a load carrying vehicle having a bed, comprising:
   a pair of spaced frames adapted to be mounted on the bed of the load carrying vehicle at ends of the bed and provided with a spring enclosing member for receiving a compression coil spring therein;
   a beam extending between and joined to said frames to form a frame assembly;
   a side panel extending along and pivotably mounted on said beam and movable between open and closed positions in relationship to said pair of spaced frames, said side panel including at least one frame member;
   a compression coil spring having one end movable in said enclosing member and the other end secured to the enclosing member, said spring being disposed in said enclosing member such that said spring slides frictionally along the inner wall of the enclosing member when the diameter of the coil expands outwardly due to the compression thereof;
   a guide means movably disposed in said enclosing member and secured to said one end of said compression coil spring; and
   a link pivotably connected between said guide means and said side panel frame member, whereby said side panel can be angularly moved between said open and closed positions under a force from said compression coil spring, and can be held at a desired position between said open and closed positions by the frictional engagement between said compression coil spring and the inner wall of said enclosing member.

2. An openable side panel mechanism according to claim 1, wherein said one of said frames includes a hollow portion formed therein for serving as said spring enclosing member.

3. An openable side panel mechanism according to claim 1, wherein the other end of said compression coil spring is adjustably secured to said enclosing member.

4. An openable side panel mechanism according to claim 1, wherein said guide means includes a guide plate mounted on said movable end of said compression coil spring and movable through said enclosing member, said guide plate being operatively coupled to said link.

5. An openable side panel mechanism according to claim 1, including a collar fixed to said beam, said side panel being pivotably mounted on said collar.

6. An openable side panel mechanism according to claim 1, including a hinge fixed to said beam, said side panel being pivotably mounted on said hinge.

7. An openable side panel mechanism according to claim 1, wherein said side panel is L-shaped in cross section so that said side panel can be stably held in said open position due to the position of its own center of gravity.

8. An openable side panel mechanism according to claim 1, including an actuator lever connected to said side panel, and a control rope secured to said actuator lever, said side panel being angularly movable from said closed position toward said open position by manually operating said actuator lever through said control rope.

9. An openable side panel mechanism for a load carrying vehicle having a bed, comprising:
   a frame assembly adapted to be mounted on the bed;
   a side panel pivotably mounted on said frame assembly and manually movable between open and closed positions in relationship to said frame assembly, said side panel including at least one frame member and a spring enclosing member for receiving a compression coil spring therein;
   said compression coil spring having one end movable in said enclosing member and the other end secured to the enclosing member, said spring being disposed in said enclosing member such that said spring slides frictionally along the inner wall of the enclosing member when the diameter of the coil expands outwardly due to the compression thereof;
   a guide means movably disposed in said enclosing member secured to said one end of said compression coil spring; and
   a link pivotably connected between said guide means and said frame assembly, whereby said side panel can be angularly moved between said open and closed positions under a force from said compression coil spring, and can be held at a desired position between said open and closed positions by frictional engagement between said compression coil spring and said enclosing member.

10. An openable side panel mechanism according to claim 9, including a knock pin by which said other end of said compression coil spring is adjustably disposed with respect to said enclosing member at said selected one of different positions.

11. An openable side panel mechanism according to claim 1, wherein said compression coil spring has a coil diameter which varies with respect to a coil pitch thereof.

12. An openable side panel mechanism according to claim 9, wherein said compression coil spring has a coil diameter which varies with respect to a coil pitch thereof.

13. An openable side panel mechanism according to claim 9, wherein the other end of said compression coil spring is adjustably secured to said enclosing member.

14. An openable side panel mechanism according to claim 9, wherein said frame member includes a hollow portion formed therein for serving as said spring enclosing member.

15. An openable side panel mechanism according to claim 9, wherein said guide means includes a guide plate mounted on said movable end of said compression coil spring and movable through said enclosing member, said guide plate being operatively coupled to said link.

16. An openable side panel mechanism according to claim 9, including a collar fixed to said beam, said side panel being pivotably mounted on said collar.

17. An openable side panel mechanism according to claim 9, including a hinge fixed to said beam, said side panel being pivotably mounted on said hinge.

18. An openable side panel mechanism according to claim 9, wherein said side panel is L-shaped in cross section so that said side panel can be stably held in said open position due to the position of its own center of gravity.

19. An openable side panel mechanism according to claim 9, including an actuator lever connected to said side panel, and a control rope secured to said actuator lever, said side panel being angularly movable from said closed position toward said open position by manually operating said actuator lever through said control rope.

* * * * *

UNITED STATES PATENT AND TRADEMARK OFFICE

Certificate

Patent No. 4,556,248                   Patented: Dec. 3, 1985

On petition requesting issuance of a certificate for correction of inventorship pursuant to 35 USC 256, it has been found that the above-identified patent, through error and without any deceptive intent, improperly sets forth the inventorship.

Accordingly, it is hereby certified that the correct inventorship of this patent is Nobuo Kobayashi, Toyota and Atsuma Hatta.

Signed and sealed this 9th day of May, 1989

Jeffrey V. Nase,
*Supervisory Petitions Examiner*
*Office of the Deputy Assistant*
*Commissioner for Patents*